United States Patent [19]

Nishida et al.

[11] Patent Number: 4,546,130
[45] Date of Patent: Oct. 8, 1985

[54] MOLDING MATERIAL FOR THE STATOR OF A SUBMERSIBLE MOTOR

[75] Inventors: Mitsuhiro Nishida; Sakuei Yamamoto; Nobuo Sonoda, all of Fukuoka; Kazuo Okahashi, Toyonaka; Shoji Takagi, Marugame, all of Japan

[73] Assignee: Mitsubishi Denki Kabushiki Kaisha, Tokyo, Japan

[21] Appl. No.: 640,838

[22] Filed: Aug. 15, 1984

[30] Foreign Application Priority Data

Sep. 6, 1983 [JP] Japan ............... 58-165383

[51] Int. Cl.$^4$ .............................................. C08L 63/00
[52] U.S. Cl. .................................... 523/459; 523/173; 310/43
[58] Field of Search .................... 523/459, 173; 310/43

[56] References Cited

U.S. PATENT DOCUMENTS

| Re. 28,646 | 12/1975 | Hedrick et al. | 523/212 |
|---|---|---|---|
| 3,901,769 | 8/1975 | Takatori et al. | 428/913 |
| 4,271,061 | 6/1981 | Suzuki et al. | 523/466 |
| 4,285,853 | 8/1981 | Schreiber | 523/466 |
| 4,387,311 | 6/1983 | Kobayashi et al. | 428/482 |
| 4,393,177 | 7/1983 | Ishii et al. | 525/175 |

FOREIGN PATENT DOCUMENTS 53-118490 10/1978 Japan.
55-83435 6/1980 Japan.

Primary Examiner—Ronald W. Griffin
Attorney, Agent, or Firm—Wenderoth, Lind & Ponack

[57] ABSTRACT

A molding material having low moisture permeability for use in the stators of submersible motors. The molding material comprises approximately 20–30 parts by weight of an epoxy resin, approximately 1–3 parts by weight of a curing agent, approximately 0.5–1.5 parts by weight of zinc stearate, approximately 2–3 parts by weight of a mechanical reinforcing agent, approximately 7.5–56.5 parts by weight of quartz powder, and one or more substances selected from anhydrous gypsum and silica gel, with the total amount of said inorganic substance(s) being approximately 55–20 parts by weight, and with the total amount of quartz powder and said inorganic substance(s) being approximately 62.5–76.5 parts by weight. Because of its low moisture permeability, the insulating properties of the molding material can be maintained indefinitely.

2 Claims, 2 Drawing Figures

MOLDING MATERIAL FOR THE STATOR OF A SUBMERSIBLE MOTOR

BACKGROUND OF THE INVENTION

The present invention relates in general to molding materials for protecting the stators of submersible motors, and in particular to a molding material having a lower moisture permeability than conventional molding materials for submersible motors.

FIG. 1 shows a simplified longitudinal cross-sectional view of the stator portion of a conventional submersible motor of the type to which the present invention is directed. In the figure, element 1 is a stator core, element 2 is the coil end portion of the stator coils for the stator core 1, element 3 is a stainless steel inner wall of a stainless steel casing (other parts of the casing not shown) which seals off the stator and protects it from moisture, element 4 is a molding material which fills all the empty spaces in the casing, and element 5 is electrical connections for the stator coils. That part of the motor lying inside the inner wall 3 is generally filled with an anti-freeze which serves to lubricate the thrust bearings (not shown) of the rotor (also not shown) of the motor.

The inner wall 3 is able to prevent anti-freeze, water, and other liquids from entering, via the rotor, the space around the stator. However, liquids are able to enter the motor from the ends of the casing or from connecting members via gap, between the inner wall 3 and the molding material 4, which form at the time of molding or thereafter. It is therefore important for the molding material to have a low permeability to moisture.

Materials commonly used for the molding material 4 include polyester resins and vinyl resins. However, such molding materials have the drawback that they are not sufficiently impermeable to moisture, and water is able to permeate the molding material 4 and reach the stator. This permeation results in an undesirable decrease in the insulating resistance of the molding material 4.

There is therefore a need for a molding material for use in the type of submersible motor illustrated in FIG. 1 which has a lower moisture permeability than presently used molding materials.

SUMMARY OF THE INVENTION

It is the object of the present invention to overcome the drawbacks of conventional molding materials for the stators of submersible motors and provide a molding material with lower moisture permeability.

In order to achieve a low moisture permeability, a molding material according to the present invention has included therein one or more inorganic substances having moisture-absorption characteristics selected from anhydrous gypsum and silica gel. When one or more of these substances is included, any moisture which enters a submersible motor is absorbed and prevented from penetrating to the stator coils.

The novel molding material according to the present invention comprises approximately 20-30 parts by weight of an epoxy resin, approximately 1-3 parts by weight of a curing agent, approximately 0.5-1.5 parts by weight of zinc stearate, approximately 2-3 parts by weight of a mechanical reinforcing agent, approximately 7.5-56.5 parts by weight of quartz powder, and one or more inorganic substances having moisture-absorption characteristics selected from anhydrous gypsum and silica gel, with the total amount of said inorganic substance(s) being approximately 55-20 parts by weight, and with the total amount of quartz powder and said inorganic substance(s) being approximately 62.5 to 76.5 parts by weight.

In a preferred embodiment, the novel molding material according to the present invention comprises approximately 20-21.5 parts by weight of an epoxy resin, approximately 1-2.5 parts by weight of a curing agent, approximately 0.5-1.5 parts by weight of zinc stearate, approximately 2-3 parts by weight of a mechanical reinforcing agent, approximately 20-55 parts by weight of quartz powder, and one or more inorganic substances having moisture-absorption characteristics selected from anhydrous gypsum and silica gel, with the total amount of said inorganic substance(s) being approximately 55-20 parts by weight, and with the total amount of quartz powder and said inorganic substance(s) being approximately 75 parts by weight.

DESCRIPTION OF THE PREFERRED EMBODIMENT

Figure 1:
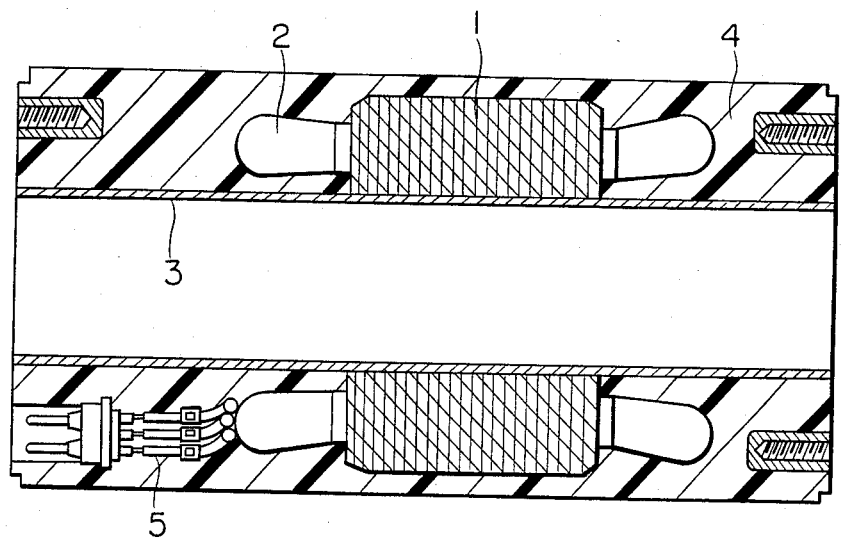
FIG. 1 is a simplified longitudinal cross-sectional view of the stator of a conventional submersible motor to which the present invention is directed.

A molding material according to the present invention is prepared by mixing an inorganic substance having moisture-absorption characteristics, an epoxy resin, a curing agent, zinc stearate, a mechanical reinforcing agent, and quartz powder in a kneader at ordinary temperatures until a uniform mixture is achieved.

An inorganic substance having moisture-absorption characteristics is included in the molding material for the purpose of absorbing any moisture which enters the casing surrounding the stator of a submersible motor, thereby preventing moisture from reaching the stator.

As the inorganic substance, one or more of anhydrous gypsum and silica gel in an amount of 55-20 parts by weight should be used. Although anhydrous gypsum and silica gel may be used in combination, the resistance to moisture of the resulting molding material is superior if either one is added alone.

As the epoxy resin, diglycidyl ether of bisphenol A such as Epicote 1001, manufactured by Shell International Chemicals Corporation, or Edolite EM 100, manufactured by Fudo Chemical Industries Inc. of Japan, in an amount of approximately 20 to 30 parts by weight, and preferably 20 to 21.5 parts by weight, is suitable. Approximately 1 to 3, and preferably 1 to 2.5, parts by weight of 4,4'-diaminodiphenyl methane (DAM) is suitable as the curing agent.

Zinc stearate is added in order to prevent the oxidation of the stator core and to increase the binding of the epoxy resin. Approximately 0.5 to 1.5 parts by weight of zinc stearate is appropriate.

As the mechanical reinforcing agent, approximately 2-3 parts by weight of a material such as glass fibers is appropriate.

Quartz powder serves as a filler in the present invention. In addition, it increases the thermal conductivity and the mechanical strength of the molding material. The amount of quartz powder may be approximately 7.5 to 56.5 parts by weight, with the total of quartz powder and the inorganic substance(s) having moisture-absorption characteristics being approximately 62.5 to 76.5 parts by weight. Preferably, however, the amount of quartz powder is approximately 20-55 parts by weight and the total of quartz powder and the inorganic substance(s) is approximately 75 parts by weight.

Three examples of a molding material will now be described. Using the conventional methods described above, three different examples of molding materials according to the present invention were prepared. The composition of each example is shown in the following table. In all three examples, anhydrous gypsum was used as the moisture-absorbing inorganic material. Diglycidyl ether of bisphenol A was used as the epoxy resin, diaminodiphenyl methane (DAM) was used as the curing agent, Silica 3H, manufactured by Tatumori Trading Company of Japan was used as quartz powder, and glass fibers were used as the mechanical reinforcing agent. For the purpose of comparison, a conventional molding material containing no anhydrous gypsum was also prepared by the same method.

The physical and electrical properties of all of the examples are shown in the same table. Permeability was determined using a JIS Z0208 test. The permeability to moisture of the examples of the present invention was significantly lower than that of the Comparative Example, while the other characteristics of the examples according to the present invention were not significantly different from those of the Comparative Example.

Figure 2:
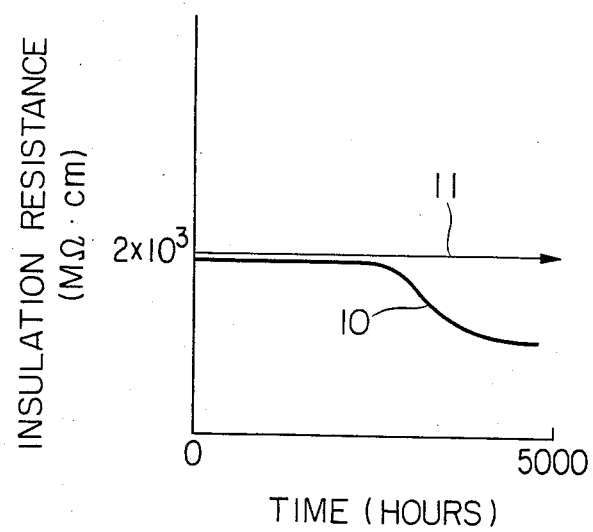
FIG. 2 is a graph of the insulation resistance for a conventional molding material (Curve 10) and for a molding material according to the present invention (Curve 11) plotted as a function of time.

To test the characteristics during use of a motor employing the molding material of the present invention, submersible motors like the one illustrated in FIG. 1 were prepared using either a conventional molding material or the present material. The motors were submerged in water having an average temperature of 25° C. (maximum temperature: 35° C.) under a water pressure of 10 kg/cm². The motors were run continuously and the electrical resistance between earth and the main stator coil was measured. FIG. 2 shows the results of resistance measurements plotted as a function of time. Curve 10 is the result for a submersible motor using a conventional molding material around the stator, and Curve 11 is the result for a motor using a molding material according to the present invention. The insulation resistance of the motor using a conventional molding material stayed constant until approximately 2500 hours, after which it rapidly decreased. In contrast, the insulation resistance of a motor using a molding material according to the present invention stayed constant for the duration of the test.

Thus, because a molding material according to the present invention has decreased permeability to moisture, its insulating properties are superior to those of conventional molding materials and can be maintained indefinitely.

What is claimed is:

1. A molding material for the stator of a submersible motor, comprising:
   approximately 20-30 parts by weight of an epoxy resin;
   approximately 1-3 parts by weight of a curing agent;
   approximately 0.5-1.5 parts by weight of zinc stearate;
   approximately 2-3 parts by weight of a mechanical reinforcing agent;
   approximately 7.5-56.5 parts by weight of quartz powder; and
   one or more inorganic substances having moisture-absorption characteristics selected from anhydrous gypsum and silica gel, with the total amount of said inorganic substance(s) being approximately 55-20 parts by weight, and with the total amount of said quartz powder and inorganic substance(s) being approximately 62.5-76.5 parts by weight, and with the total weight of said molding material being 100 parts by weight.

2. A molding material as claimed in claim 1, wherein:
   the amount of said epoxy resin is approximately 20-21.5 parts by weight;
   the amount of said curing agent is approximately 1-2.5 parts by weight;
   the amount of said quartz powder is approximately 20-55 parts by weight; and
   the total amount of said quartz powder and said inorganic substance(s) is approximately 75 parts by weight.

|  | Comparative Example | Example 1 | Example 2 | Example 3 |
|---|---|---|---|---|
| COMPOSITION | | | | |
| Moisture-absorbing inorganic material | — | 20 | 40 | 55 |
| Quartz powder | 75 | 55 | 35 | 20 |
| Epoxy resin | 20 | 20 | 20 | 20 |
| Curing agent | 2 | 2 | 2 | 2 |
| Zinc stearate | 1 | 1 | 1 | 1 |
| Reinforcing agent | 2 | 2 | 2 | 2 |
| CHARACTERISTICS | | | | |
| Spiral Flow (mm) | 600 | 560 | 530 | 500 |
| Mold Shrinkage Factor (%) | 0.5 | 0.5 | 0.5 | 0.5 |
| Insulation Resistance: Ordinary State (ohm-cm) | $1.7 \times 10^{10}$ | $1.5 \times 10^{10}$ | $1.6 \times 10^{10}$ | $1.8 \times 10^{10}$ |
| Insulation Resistance: After Boiling (ohm-cm) | $1.5 \times 10^9$ | $1.3 \times 10^9$ | $1.0 \times 10^9$ | $0.5 \times 10^9$ |
| Bending Strength (kg/cm²) | 13.0 | 13.4 | 14.0 | 13.6 |
| Breakdown Strength (kv/mm) | 14.5 | 14.2 | 13.5 | 13.0 |
| Permeability (g/m² * 24 hr) | 0.7 | 0.5 | 0.4 | 0.3 |

Note:
All amounts given as parts by weight.